United States Patent [19]

Chiron

[11] 4,179,595
[45] Dec. 18, 1979

[54] MULTIMODAL RESONANT CAVITY FOR VERY HIGH FREQUENCY HEATING

[75] Inventor: Georges Chiron, Chambery, France

[73] Assignee: Saint-Gobain Industries, Neuilly-sur-Seine, France

[21] Appl. No.: 824,732

[22] Filed: Aug. 15, 1977

[30] Foreign Application Priority Data

Aug. 19, 1976 [FR] France .............................. 76 25205

[51] Int. Cl.² .............................................. H05B 9/06
[52] U.S. Cl. ...................... 219/10.55 F; 219/10.55 A
[58] Field of Search ................ 219/10.55 F, 10.55 A, 219/10.55 R

[56] References Cited

U.S. PATENT DOCUMENTS

| | | | |
|---|---|---|---|
| 3,461,261 | 8/1969 | Lewis et al. ................... | 219/10.55 A |
| 3,551,199 | 12/1970 | Forster ........................ | 219/10.55 A |
| 3,784,777 | 1/1974 | Soulier ......................... | 219/10.55 A |
| 3,843,862 | 10/1974 | Staats et al. ................... | 219/10.55 F |
| 3,855,440 | 12/1974 | Staats et al. ................... | 219/10.55 F |
| 4,003,774 | 1/1977 | Lebet et al. ................... | 219/10.55 A |
| 4,065,654 | 12/1977 | Moore ........................... | 219/10.55 F |

Primary Examiner—Arthur T. Grimley
Attorney, Agent, or Firm—John T. Synnestvedt; M. Richard Page

[57] ABSTRACT

Microwave heating apparatus especially useful for heating and curing reinforced thermo-hardenable synthetic resins is disclosed. Heating cells are formed by parallelepipedal enclosures, the walls of which are odd multiples of ¼ the wavelength of electromagnetic energy being utilized for heating. Adjustment means for adjusting the enclosure to minimize reflected power are mounted within the enclosure. A production line comprises a series of successive heating cells that are supplied from the same power source; die structures between the cells can be used to form the material being processed.

7 Claims, 3 Drawing Figures

MULTIMODAL RESONANT CAVITY FOR VERY HIGH FREQUENCY HEATING

FIELD OF THE INVENTION

This invention relates to the use of microwave heating apparatus, particularly useful for thermally treating materials, especially continuous-length materials, during the course of production to effect polymerization and drying.

The apparatus is particularly useful for the production of continuous shapes formed of thermo-hardenable synthetic resins, especially those reinforced, for example, with glass fibers. These materials have low thermal conductivity, but generally favorable dielectric properties and heating by dielectric loss is a preferred method for inducing extremely rapid temperature changes in such materials for initiating polymerization and for supplying the remaining energy necessary for maintaining the polymerization reaction and for drying the material.

BACKGROUND OF THE INVENTION

The power that can be imparted to a body in an electric field is a function of the frequency of the applied power and the square of the electric field E. However, the value of E is practically limited by the risk of dielectric breakdown and resultant corona discharge that can cause ignition of the material being heated. Thus, in a practical sense, if it is desired to raise the amount of power dissipated in a material for purposes of heating it, it is necessary to increase the frequency of the applied power.

Practically speaking, there are two frequency bands that can be used for heating, and these bands involve very different technologies. High frequencies of from 1 to 100 MHz, using conventional dielectric heating techniques, can be utilized. Extremely high frequencies, for example, micro-wave frequencies, can be utilized using shielded transmission lines or wave guides in place of the standard inductances and capacitances in dielectric heating arrangements.

Although it seems more desireable to utilize energy in the micro-wave spectrum, up until the present, there have been restraints which have limited its use.

Previously proposed heating apparatus have utilized cells comprising progressive wave systems (for example, for 2450 MHz, wave guides of the RG 112 type with a section of 43×86 mm) or interconnected sections of wave guides that form resonant cavities. These cells cause the formation of a very precise distribution of the electric field within the cell and as a result, the usable zone of the cell is reduced. Also, if the dimensions of the products to be treated are large (for example, for shapes with dense cross sections, with the cross sectional areas exceeding 15 mm$^2$), the consequent disturbances to the propagation of the electromagnetic waves renders the system useless.

To overcome these shortcomings, it has been proposed to utilize a multimodal cavity comprising a mettalic parallelepipedal box of copper, aluminum or other light alloy, connected to a suitable generator by an appropriate wave guide element. The three dimensions of the enclosure are multiples of $\frac{1}{4}$ the wavelength of the energy supplied by the generator. Such apparatus are of larger dimension and allow the heating of shapes of larger cross section, but generally have low production rates.

SUMMARY OF THE INVENTION

The object of the invention is a heating apparatus capable of thermally treating shapes of large cross section at high production rates, by means of microwave wave energy. The apparatus is characterized in that the three dimensions of the enclosure forming the heating cell are odd multiples of the wavelength of the applied electromagnetic energy. Also, according to the invention, a relationship is established between the enclosure and the generator such that there is minimum reflection of the energy back toward the generator; measurements of the reflected energy show that reflection attenuations of between 25 to 30 dB can easily be obtained, corresponding to stationary wave rates (TOS) in the wave guides of approximately 1.08 to 1.12.

Such an enclosure therefore acts as a resonant cavity containing a multitude of degenerated modes, with the result that the electric field within the enclosure is relatively uniform, thereby making the internal volume of the enclosure practically homogeneous with respect to heating power. This is evident as the products traverse the cell.

The three dimensions of the cavity (height, width and length) may differ, but are each determined by the relationship: $(2k+1)\lambda/4$ (with k being a whole number or very close to a whole number). This relationship permits construction of heating cells adaptable to the products to be treated, which may be of various forms and types.

According to one particularly advantageous embodiment of the invention, means are provided for compensating for discrepancies in the dimensions of the cavity, which, practically speaking, are difficult to obtain with the desired degree of exactness. In addition, the adjusting means provides for initial adjustment of the cell in accordance with the material being treated, and also provides for automatic adjustment for regulation of the energy supplied to the cell.

The adjustment means comprises a double system, one part of which provides rough adjustment of the cell and the other part of which provides fine adjustment of the cell for taking into account the material in the cavity. The component for rough adjustment comprises a thin plate placed parallel to one side of the enclosure, preferably facing the wave guide, that is, moveable toward and away from the side on which it is mounted a distance equal to between zero and $\lambda/8$ of the electromagnetic energy supplied. The component for fine control comprises an adjustable plate facing the incident wave beam, the orientation of the plate with respect to the beam being changeable, thereby modifying the distribution and the reflection of the electromagnetic field. Preferably, the dimensions of the plate are between $\lambda/4$ and $\lambda/2$ of the applied electromagnetic energy.

A system for measuring the incident and reflected power is mounted in the wave guide connecting the generator to the enclosure. The measurement system utilizes a standard bi-direction coupler connected to two high-frequency milliwattmeters; the first meter indicates incident power and the second indicates reflected power.

The adjustment may be continuous and automatic and correction may be achieved even in the course of operation to compensate for the inevitable variations in dielectric loss which can cause either variation in the temperature or variation of the heterogeneity of the treated material.

In order to form a production line, for example for the polymerization of continuous shapes, it is possible to connect several cells to the same generator by the use of power dividers. It is likewise possible to provide forming means for the treated material, such as short metallic bushings for calibration of the shapes, between the cells. In addition, the zones between cells can be thermally insulated by sleeves through which the treated materials pass.

DETAILED DESCRIPTION

FIG. 1 illustrates a cell according to the invention, constructed of an aluminum sheet 1.5 mm thick, for operation at a frequency F=2450 MHz. It is illustrated in the form of a parallelepipedal enclosure, the dimensions of which, perpendicular to the respective sides A, B, and C are determined according to the relationship length $l=(2k+1)\times\lambda/4$ and are as follows:

Figure 1:
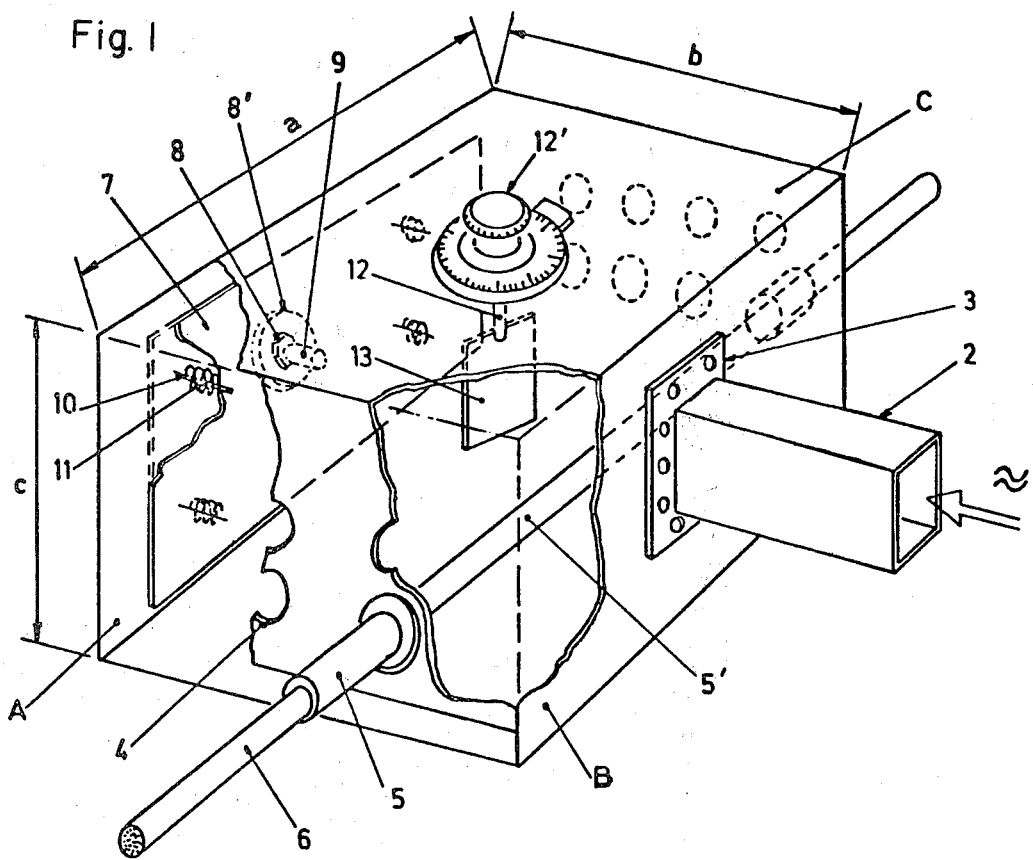
FIG. 1 is a perspective view displaying a multimodal resonant cavity for heating and polymerizing cylindrical rods.

a=458 mm corresponding to k=7
b=336 mm corresponding to k=5
c=214 mm corresponding to k=3

Microwave energy is introduced through a rectangular opening 43×86 mm in one of the walls, for example wall B, of the enclosure. The microwave energy is conducted by means of a suitable wave guide 2, for example a type RG 112 wave guide, affixed to the enclosure 1 by a flange 3.

The wall A and the opposed wall of the enclosure parallel to wall A, have a series of aligned orifices 4. Each orifice 4 carries a metallic tube 5 which permits the material 6 to traverse the cell while assuring effective shielding of microwave radiation from the enclosure. Ducts 5', closely sized to the material 6 and formed of a suitable dielectric material such as polytetrafluoroethylene, extend between the tubes 5 and are provided to protect the interior of the enclosure from solvent vapors or the like that may escape out of the material 6.

In the interior of the enclosure, and parallel to the side opposite to that which supports the wave guide 2, i.e., facing the direction of incident energy, is a movable metallic plate 7 that may be formed of aluminum. The dimensions of the plate are length a $-20$ mm (i.e., 438 mm) and length c $-20$ mm, that is 194 mm. This plate is mounted on posts 10 and is biased toward the interior of the enclosure by springs 11. A threaded control spindle 9 is fixed to the center of the plate 7. A rotatable threaded member 8 on the exterior of the enclosure coacts with the spindle 9 to provide for displacement of the plate 7 a distance on the order of 2 cm. A graduated knob 8' engaging the threaded member 8, marks the position of the plate. Movement of the plate 7 provides for rough adjustment of the tuning of the enclosure to minimize reflected energy.

On the wall C of the enclosure, is mounted a rotatable spindle 12 aligned with the axis of the wave guide 2 and disposed at a right angle thereto. The spindle 12 carries a planar member or plate 13, the dimensions of which are 55×55 mm. The lower edge of the plate is approximately 70 mm from the wall C and is above the ducts 5'. The spindle 12 is provided with a graduated knob 12' for indicating the orientation of the plate 13 with respect to the axis of the wave guide 2.

Figure 2:
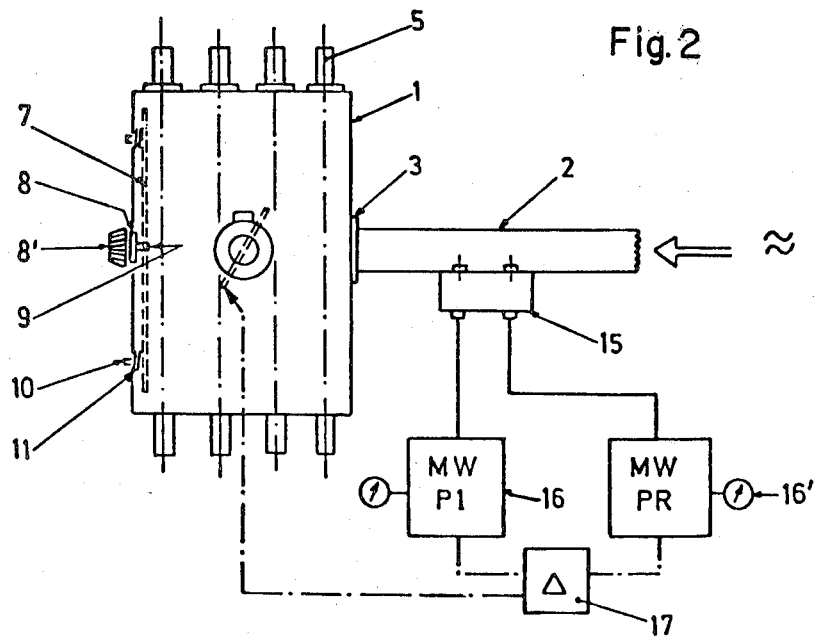
FIG. 2 is a top view of an installation comprising a multimodal resonant cavity with a measuring system for controlling certain adjustments.

Referring to FIG. 2, the wave guide 2 has mounted thereon a bi-directional connector of known type that provides for detection of incident and reflected energy passing through the wave guide. The incident and reflected energies are measured by milliwattmeters 16 and 16' provided with standard bolometers. Incident power is read from the meter 16 and reflected power is read from the meter 16'. By observing the respective meter readings, the control knobs 8' and 12', that allow for the displacement of plate 7 and the rotation of planar member 13 respectively, can be adjusted to minimize the reflected power with the stationary wave length (TOS) near 1.1, thereby providing optimum conditions for production.

A differential measuring element 17 may be used to detect the differences between the readings of meters 16 and 16' and generate a suitable control signal for changing the position of the plate 13 by appropriate means such as a servomotor with appropriate feedback circuitry. This provides for automatic regulation of optimum conditions.

Figure 3:
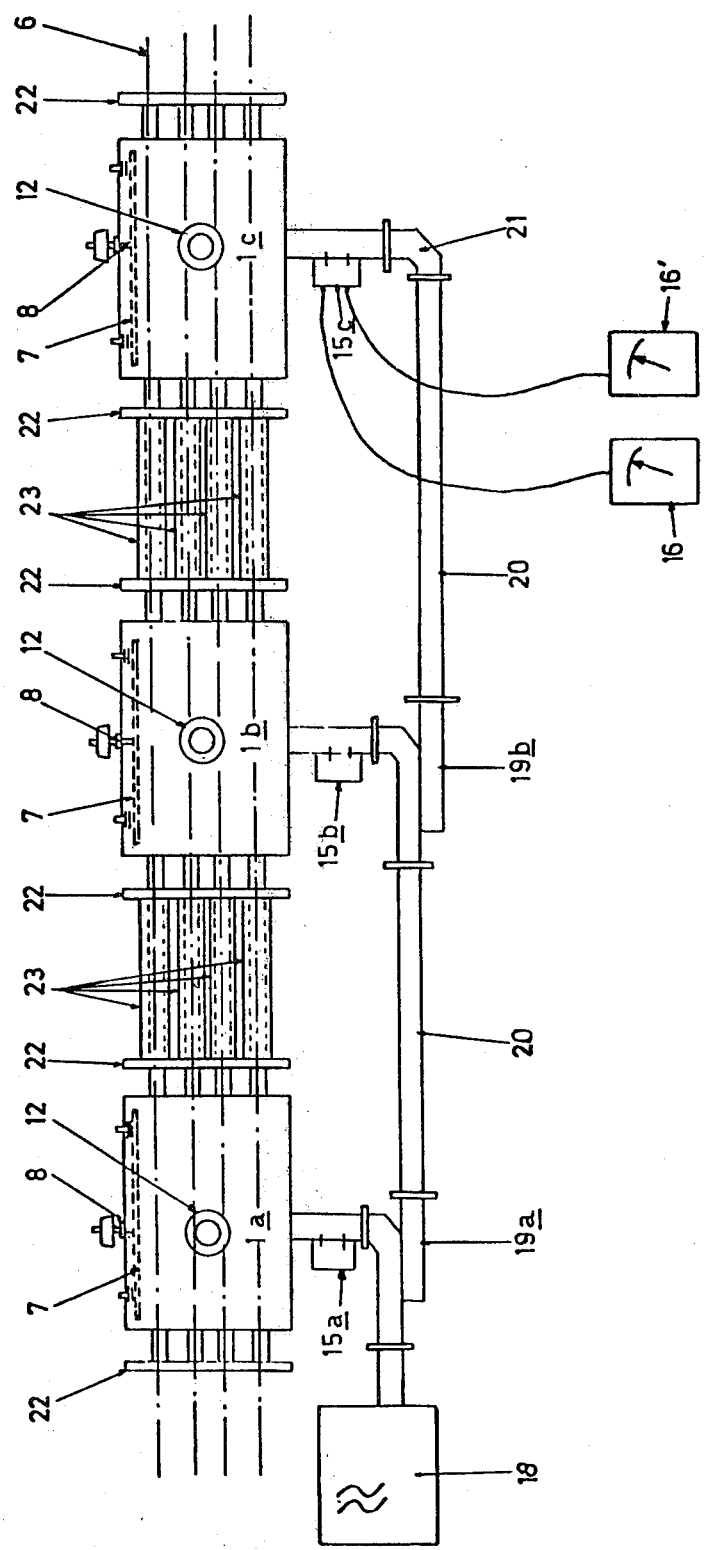
FIG. 3 is a polymerization line for cylindrical rods using three multimodal resonant cavities.

Referring to FIG. 3, there is shown a complete polymerization section for cylindrical rods. A microwave generator 18 supplies energy through wave guides 20 and power dividers 19a, 19b and fitting 21 to enclosures 1a, 1b, 1c respectively. The first cell 1a receives half the power from generator 18 by means of divider 19a. The other half of the power is supplied to divider 19b which in turn supplies a quarter of the total power to cell 1b and a quarter of the total power to cell 1c. This distribution permits the cell 1a to heat the treated material to the ideal polymerization temperature and the other cells merely need to supply sufficient heat to assure continuance of the reaction temperature. Measuring systems 15a, 15b and 15c of the type previously discussed in connection with FIG. 2, each having milliwattmeters 16, 16', are utilized to assure the optimum conditions for each cell.

Between the cells 1a, 1b and 1c, are forming components, such as a carrier plate 22 with short metallic dies, as well as thermal insulation sleeves 23 that reduce heat loss between the heating cells.

Conventional components for forming and conveying the formed structure are placed upstream and downstream from the apparatus shown in FIG. 3 and no further explanation of these components is believed necessary.

By way of example, utilizing the apparatus illustrated in FIG. 3, the simultaneous polymerization of four rods of polyester resin 20 mm in diameter, reinforced with glass fiber, was accomplished at a speed of 1 m/mn, using a 5 kW generator, supplying electromagnetic energy at a frequency of 2450 MHz.

I claim:

1. High frequency heating apparatus comprising a resonant parallelepipedal metallic enclosure, generating means for generating high frequency electromagnetic energy in the micro-wave range, wave guide means for connecting the generator to the enclosure, the three dimensions of the enclosure being odd multiples of $\frac{1}{4}$ the wavelength of the electromagnetic energy generated by the generator; a rough adjustment member comprising a plate spaced parallel to one side of the enclosure and means mounting the plate for movement a distance in the range between zero and ½ the wavelength of the energy supplied by the generator in a direction normal to the plane of said side of the enclosure; and a fine adjustment member having a planar surface facing the wave guide means and means for changing the angular relationship of the plane of the planar surface with respect to the wave guide means.

2. Apparatus as in claim 1 wherein the plate faces the wave guide means.

3. Apparatus as in claim 1 wherein the dimensions of the surfaces of the member are between ¼ and ½ the wavelength of the energy supplied by the generator.

4. Apparatus according to claim 1 including means for measuring incident and reflected energy in the wave guide means.

5. Apparatus as in claim 1 including at least one duct formed of a dielectric material extending through the enclosure in a direction perpendicular to the direction of incident electromagnetic waves for conducting material to be treated through the enclosure.

6. Heating and forming apparatus comprising a first parallelepipedal resonant metallic enclosure and a second parallelepipedal resonant metallic enclosure, a forming die located between the first and second enclosures, a generating means for generating electromagnetic energy in the micro-wave range, wave guide means for conducting electromagnetic energy from the generator means to the enclosures, the three dimensions of each enclosure being odd multiples of ¼ the wavelength of the energy generated by said generating means, each enclosure including a rough adjustment member comprising a plate placed parallel to one side of the enclosure and means mounting the plate for movement a distance in the range between zero and ½ the wavelength of the energy supplied by the generator in a direction normal to the plane of said side of the enclosure, and a fine adjustment member having a planar surface facing the wave guide means and means for changing the angular relationship of the plane of the planar surface with respect to the wave guide means.

7. Apparatus as in claim 6, wherein the enclosures are supplied with electromagnetic energy from the same generating means.

* * * * *